(12) United States Patent
Merkle et al.

(10) Patent No.: US 10,112,600 B2
(45) Date of Patent: Oct. 30, 2018

(54) SELF-PROPELLING WORK MACHINE AND METHOD FOR BRAKING SUCH A WORK MACHINE

(71) Applicant: Liebherr-Components Biberach GmbH, Biberach an der Riss (DE)

(72) Inventors: Markus Merkle, Munderkingen (DE); Juergen Resch, Ingoldingen-Degernau (DE); Sebastien Nicolas Hoffmann, Colmar (FR); Burkhard Emanuel Richthammer, Freiburg (DE); Bernd Sommer, Biberach an der Riss (DE); Stefan Duelli, Eberhardzell (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 0 days.

(21) Appl. No.: 15/707,863

(22) Filed: Sep. 18, 2017

(65) Prior Publication Data

US 2018/0065621 A1    Mar. 8, 2018

Related U.S. Application Data

(63) Continuation-in-part of application No. 15/025,508, filed as application No. PCT/EP2014/002436 on Sep. 9, 2014, now abandoned.

(30) Foreign Application Priority Data

Sep. 27, 2013  (DE) .................. 10 2013 016 126
Oct. 11, 2013   (DE) .................. 10 2013 016 915
Dec. 19, 2013  (DE) .................. 10 2013 021 607

(51) Int. Cl.
*B60W 20/15*    (2016.01)
*B60W 10/18*    (2012.01)
(Continued)

(52) U.S. Cl.
CPC ............... *B60W 20/15* (2016.01); *B60K 6/20* (2013.01); *B60L 7/08* (2013.01); *B60L 7/18* (2013.01);
(Continued)

(58) Field of Classification Search
CPC ...... B60W 20/15; B60W 10/04; B60W 10/18; B60W 10/30; B60L 7/08; B60L 7/18; B60L 7/26; B60K 6/20–6/22
See application file for complete search history.

(56) References Cited

U.S. PATENT DOCUMENTS 6,318,487 B2 * 11/2001 Yanase ............... B60K 6/46
                                                       180/65.245
6,577,483 B1 *  6/2003 Steicher ............. H02P 3/18
                                                       318/370

(Continued)

FOREIGN PATENT DOCUMENTS

AT         12010 U2      9/2011
DE       10244769 A1     4/2004
(Continued)

OTHER PUBLICATIONS

ISA European Patent Office, International Search Report Issued in Application No. PCT/EP2014/002436, dated Feb. 25, 2015, WIPO, 10 pages.

(Continued)

*Primary Examiner* — Erez Gurari
(74) *Attorney, Agent, or Firm* — McCoy Russell LLP

(57) ABSTRACT

Methods and systems are provided related to a self-propelling work machine in the form of a tracked vehicle having an electric drive, with a generator drivable by an internal combustion engine, an auxiliary unit connected to the engine, and a braking apparatus for braking the work machine. The braking apparatus provides regenerative brak-
(Continued)

ing by the electric drive and comprises a feedback apparatus for feeding back electrical motor braking power of the electric motor to the generator to apply the motor braking power on the engine and on the auxiliary unit. A controller automatically increases or decreases the electrical load of the auxiliary unit based on the electrical motor braking power fed back to the engine and/or based on an engine speed.

13 Claims, 4 Drawing Sheets

(51) Int. Cl.

| | | |
|---|---|---|
| *B60W 10/30* | (2006.01) | |
| *B60L 11/02* | (2006.01) | |
| *B60L 7/08* | (2006.01) | |
| *B60L 7/18* | (2006.01) | |
| *B60L 7/26* | (2006.01) | |
| *B60K 6/20* | (2007.10) | |
| *B60W 10/04* | (2006.01) | |

(52) U.S. Cl.
CPC .............. *B60L 7/26* (2013.01); *B60L 11/02* (2013.01); *B60W 10/04* (2013.01); *B60W 10/18* (2013.01); *B60W 10/30* (2013.01); *B60W 2510/18* (2013.01); *B60W 2540/12* (2013.01); *B60W 2710/0627* (2013.01); *B60W 2710/0644* (2013.01); *B60W 2710/086* (2013.01); *B60W 2710/18* (2013.01); *B60W 2710/305* (2013.01); *Y10S 903/93* (2013.01)

(56) References Cited

U.S. PATENT DOCUMENTS

| | | | | |
|---|---|---|---|---|
| 7,261,170 B2* | 8/2007 | Leifert | ...................... | B60L 7/22 180/305 |
| 7,950,481 B2* | 5/2011 | Betz | .................... | B60K 6/46 180/6.44 |
| 8,395,335 B2* | 3/2013 | Marchand | ............... | B60L 1/003 318/362 |
| 2005/0137060 A1 | 6/2005 | Kuras et al. | | |
| 2007/0273316 A1* | 11/2007 | Yoshimatsu | ............ | E02F 9/121 318/371 |
| 2008/0298977 A1* | 12/2008 | Juricak | ................... | B60T 10/04 417/1 |
| 2011/0092334 A1* | 4/2011 | Baino | .................... | B60K 6/387 477/5 |
| 2011/0249421 A1* | 10/2011 | Matsuo | .................. | B60K 6/445 361/821 |
| 2012/0004797 A1* | 1/2012 | Baino | ....................... | B60K 6/48 701/22 |
| 2013/0164109 A1* | 6/2013 | Yamazaki | ....... | B60W 30/18127 414/744.2 |
| 2016/0059857 A1* | 3/2016 | Ikedaya | ................ | B60W 10/18 701/22 |
| 2016/0084494 A1* | 3/2016 | Sonnervig | ............... | H02J 15/00 392/307 |
| 2016/0164296 A1* | 6/2016 | Whitehouse | ............ | H02M 1/32 363/35 |
| 2016/0197600 A1* | 7/2016 | Kuznetsov | ............... | H03K 3/45 307/106 |
| 2016/0229295 A1* | 8/2016 | Hoffmann | ................ | B60K 6/46 |
| 2016/0257215 A1* | 9/2016 | Merkle | .................... | B60K 6/46 |
| 2017/0282889 A1* | 10/2017 | Books | .................... | B60W 10/30 |
| 2017/0291501 A1* | 10/2017 | Takahashi | ........... | B60L 11/1859 |

FOREIGN PATENT DOCUMENTS

| | | |
|---|---|---|
| DE | 102009033953 A1 | 2/2010 |
| DE | 102011012724 A1 | 8/2012 |
| DE | 102011013746 A1 | 9/2012 |
| DE | 102011089102 A1 | 6/2013 |
| DE | 102012208063 A1 | 11/2013 |
| EP | 2500197 A2 | 9/2012 |
| EP | 2666692 A1 | 11/2013 |
| WO | 2012099255 A1 | 7/2012 |
| WO | 2015043715 A1 | 4/2015 |

OTHER PUBLICATIONS

ISA European Patent Office, International Search Report Issued in Application No. PCT/EP2014/002437, dated Mar. 2, 2015, WIPO, 10 pages.

* cited by examiner

SELF-PROPELLING WORK MACHINE AND METHOD FOR BRAKING SUCH A WORK MACHINE

CROSS REFERENCE TO RELATED APPLICATIONS

The present application is a continuation of U.S. National Phase patent application Ser. No. 15/025,508, entitled "Self-Propelling Work Machine and Method for Braking Such a Work Machine," filed on Mar. 28, 2016. U.S. National Phase patent application Ser. No. 15/025,508 claims priority to International Patent Application No. PCT/EP2014/002436, entitled "Self-Propelled Working Machine and Method for Braking a Working Machine of This Type," filed on Sep. 9, 2014. International Patent Application No. PCT/EP2014/002436 claims priority to German Patent Application No. 10 2013 021 607.9, filed on Dec. 19, 2013, and to German Patent Application No. 10 2013 016 915.1, filed Oct. 11, 2013, and to German Patent Application No. 10 2013 016 126.6, filed Sep. 27, 2013, the entire contents of each of which are hereby incorporated by reference in their entirety for all purposes.

TECHNICAL FIELD

The present disclosure relates to a self-propelling work machine and a method of braking such a work machine. In one example, the working machine is in the form of a tracked vehicle, such as a bulldozer, having an electric drive comprising at least one electric motor, a generator drivable by an internal combustion engine for the supply of the electric drive with electrical energy, at least one auxiliary unit connected to the internal combustion engine, as well as a braking apparatus for braking the work machine. The braking apparatus provides regenerative braking via the electric drive and comprises a feedback apparatus for feeding back electrical motor braking power from the electric motor to the generator, which can in turn apply the motor braking power on the internal combustion engine and on the auxiliary unit connected thereto.

BACKGROUND AND SUMMARY

With self-propelling work machines, such as bulldozers, tracked vehicles, or other self-propelling off-road vehicles for construction sites, mines and the like, electric drives having at least one electric motor have been used in recent times to leverage the typical advantages of such electric drives with respect to hydrostatic drives, such as their higher efficiency and easier maintenance. Considerably lower operating costs can also be achieved by operating at substantially lower powers due to the increased efficiency of such drives. The electric drive can be utilized both as a traction drive for driving at least one chain drive of an undercarriage as well as for driving a main work unit such as the milling drum of a surface miner.

A generator can be provided to supply energy for operating the electric drive. In one example, said generator may be drivable by an internal combustion engine, for example in the form of a diesel engine, a gasoline engine, or a gas engine. The engine may drive one or more auxiliary devices via the generator. In other words, the generator is a load on the engine. Also, when operating, the one or more auxiliary devices are also a load on the engine. For example, not only the power generator, but also a hydraulic unit, such as a pump or fan of the hydraulic unit, can be driven by the internal combustion engine so as to hydraulically drive other adjustment actuators of hydraulic components. With a bulldozer, for example, the adjustment and/or lifting device for the trenching shovel can be driven by means of such hydraulic actuators via the engine (and the generator). With dump trucks, as another example, the dump body can be rocked up and down by means of a hydraulic actuator via the engine (and the generator).

One example of a bulldozer having such a drive concept comprising an electric drive is shown in U.S. Pat. No. 7,950,481. Therein an electric motor is centrally arranged so that its drive power can be used to drive different elements via a differential. Excess electrical energy which is generated by the generator when an associated internal combustion engine is not utilized to capacity is stored in a battery in order to be able to transfer additional electrical energy in the sense of a boost function to the electric motor when the latter requires a particularly high power, such as on the starting up of the machine. If, conversely, the work machine is to be braked, mechanical brakes in the form of spring pre-loaded disk brakes which can be hydraulically ventilated are actuated. However, the inventors have recognized an issue with such systems. Depending on the size of the work machine and on its function/purpose, such brakes may have to be dimensioned large in order not to overload or overheat on intensive braking procedures over an extended duration, such as can be the case with bulldozers constantly moving backward and forward or with fully loaded dump trucks traveling downhill. In still other examples, the amount of electrical energy that can be received at the battery may be limited due to constraints such as battery temperature, battery state of charge, battery load, etc. In such a scenario, the excess electrical energy is dumped and cannot be productively used.

In another example, U.S. Pat. No. 8,395,335 B2 describes an electric drive system for off-road trucks in which the electrical drive energy is provided by an internal combustion engine which drives a generator. During braking operations, electrical motor braking power provided by the electric motors is transferred to the generator to reduce the fuel consumption of the internal combustion engine. Excess electrical motor braking power is furthermore transferred past the internal combustion engine to electrical auxiliary units to drive these electrical units electrically and is finally dissipatively reduced or "burnt", e.g., converted into heat, via electrical braking resistors in the form of a so-called grid box. The distribution of the electrical motor braking power, however, requires a relatively complicated control system while taking account of the electrical energy usable at the auxiliary units. In addition, the thermal load arising at the grid box has to be taken into account.

It is the underlying object of the present disclosure to provide an improved work machine of the initially named kind as well as an improved method for braking such a work machine which avoid disadvantages of the prior art and further develops the latter in an advantageous manner. An energy-efficient braking with sufficient decelerations may be made possible using a braking apparatus which is of a simple design and is easy to control.

In one example, the above mentioned issues may be overcome by a work machine comprising a self-propelling work machine, the machine comprising an internal combustion engine; an electric drive having at least one electric motor, a generator drivable by the internal combustion engine and supplying the electric drive with electrical energy, and at least one auxiliary unit coupled to the internal combustion engine; a braking apparatus configured to provide a regenerative braking by the electric drive; a feedback apparatus for feeding back electrical motor braking power from the electric motor to engine via the generator, and a controller with computer readable instructions stored on non-transitory memory for adjusting the electrical load of the at least one auxiliary unit of the engine based on the electrical motor braking power fed back to the internal combustion engine via the generator. The above mentioned issues may also be addressed by a method for braking a work machine comprising: responsive to a braking demand, generating electrical power from regenerative braking at an electric motor of an electric drive of the hybrid vehicle; transferring the generated electrical power from the electric motor to a generator coupled to an engine; and adjusting one or more of an engine fueling, an engine speed, and an electrical load applied by an auxiliary device on the engine via the generator based on the generated electrical power.

As an example, a braking power applied on an internal combustion engine may be controlled by varying the load applied on the engine by at least one auxiliary unit (or device) which is connected to the internal combustion engine (herein also referred to as power pick-up of the auxiliary unit). The auxiliary unit applying load on the engine may be, for example, in the form of a fan, a cooling apparatus, or a pump. The auxiliary unit applying load on the engine may include the unit applying a load on the generator wherein the generator is driven by the engine. In particular, the auxiliary unit may draw a current from the generator, wherein the electrical current or load at the generator is generated via the spinning engine. A control apparatus may automatically increase or decrease the load applied by the at least one auxiliary unit on the generator, and thereby on the engine, based on the electrical motor braking power fed back to the internal combustion engine (that is, the regenerative braking power generated via the electric motor which is then fed back to the generator). Additionally or optionally, the power consumption of or load applied by the at least one auxiliary unit may be varied by the control apparatus based on the operating state (e.g., the engine speed) of the internal combustion engine acted on by fed back motor braking power. The electrical motor braking power that is being generated and fed back can be measured or determined directly by determining an electrical characteristic such as the voltage or current of a feedback apparatus, for example via an inverter. Alternatively, the electrical motor braking power can be inferred or indirectly determined based on a characteristic accompanying the motor braking power such as a torque which the generator generates while being acted on by the fed back motor braking power. The power pick-up or load applied by the auxiliary unit can, however, not only be controlled in dependence on the motor braking power itself, but also in dependence on the operating state of the internal combustion engine acted on by the fed back motor braking power and/or on the auxiliary unit connected thereto, for example based on a speed of the internal combustion engine.

In this way, the regenerative motor braking power can be varied, thereby enabling the total braking power to also be varied (e.g., increased) in a controlled manner. The technical effect of such a control of the regenerative braking power is that the application, and therefore the wear and tear, of any mechanical brakes included in the drive system can be delayed. In addition, an even more efficient operation of the work machine can be achieved. For example, a power output of a fan or a cooling apparatus of the vehicle can be ramped up to beyond a degree required to cool corresponding units (that is, to provide more than the requested cooling) so that during vehicle operation on a subsequent ascent or on a level path, the auxiliary unit can be switched off for longer or can be operated at a lower power than required.

As another example, an auxiliary unit such as a pump can be operated in a dissipative manner with a higher output, and thereby a higher load applied on the generator and the engine (herein also referred to as a higher power pick-up) in order to increase the regenerative motor braking power, for example by increasing the flow rate of the pump, such as by connecting a flow resistance.

A hydraulic pump which is not required for vehicle travel operation (that is, for vehicle propulsion) and which either conveys in idle circulation during driving or is swiveled to a conveying quantity of zero can in one example be used as the auxiliary unit with whose assistance the retard capacity (that is, the ability of the generator to receive the motor braking power generated at the motor during regenerative braking) of the retard system comprising the internal combustion engine and the auxiliary unit can be variably controlled. To increase the retard or braking capacity of the retard system during a braking operation, the power pick-up of the hydraulic pump conveying in idle circulation during driving can advantageously be increased in that a flow resistance is successively increased in circulation. For this purpose, for example, a pre-controllable pressure-relief valve can be used which is correspondingly controlled by the control apparatus when a higher retard/braking performance and thus a higher flow resistance is required.

If the hydraulic pump used as the auxiliary unit is swiveled to conveying a quantity of zero during driving, the power pick-up of the hydraulic pump can advantageously be increased in that the hydraulic pump is successively swiveled out in circulation against a constant flow resistance, and against a fixedly set pressure relief valve.

One example of such a hydraulic pump not required in driving operation includes the hydraulic pump for the pressure circuit of a bulldozer, the pressure circuit used to adjust the dozer blade.

Alternatively or additionally to such a hydraulic pump, a cooling apparatus, for example a cooling fan, can be used as the auxiliary unit whose power pick-up (or load applied by the cooling fan on the generator coupled to the engine) can be ramped up when the required braking power increases, and which can be ramped down when the required braking power decreases. It will be appreciated that the load applied by the auxiliary unit on the generator may be varied while the engine is operated in a speed control mode so that the engine speed can be maintained while reducing the fueling of the engine, providing fuel economy and engine performance benefits.

The control apparatus can in particular increase the power consumption of at least one such auxiliary unit before a mechanical brake is used and/or further motor braking power of the at least one electric motor is dissipatively reduced, e.g. burnt, for example via a braking resistor.

The control apparatus in this respect advantageously provides that the desired braking effect is primarily achieved by regenerative braking via the electric motor(s) and the electrical motor braking power generated in thus process is applied on the internal combustion engine and on the auxiliary units connected thereto (via the generator) until the retard capacity of the internal combustion engine and of the auxiliary unit(s) is essentially completely exhausted. The retard capacity being exhausted includes the generator not being able to accept any more braking power (such as in the form of an electric current or voltage) from the electric motor(s) and maintaining engine speed control. In one example, the retard capacity may be limited due to a battery coupled to the engine system being too hot or due to the state of charge of a battery coupled to the generator being too low.

The braking energy or the electrical motor braking power provided by the at least one electric motor is advantageously primarily fed back (in the form of electric current or voltage) to the internal combustion engine via the generator when the vehicle is coasting. The generator then converts the electrical motor braking power into mechanical drive power for the internal combustion engine which is used for driving one or more secondary power consumers (or auxiliary units) such as fans, coolers or pumps connected to the internal combustion engine, and for overcoming the drag resistances of the internal combustion engine. In this way, the regenerative braking power can be used to supply the generator with current to support the electrical load of the auxiliary units, while reliance on the engine to supply the generator with current to support the electrical load of the auxiliary units is reduced. As a result, while the engine is operated in a speed-control mode, the engine speed can be maintained with engine fueling gradually reduced and while the auxiliary loads continue to be supported via the generator.

If one or more of the motor braking power applied on the internal combustion engine and on the auxiliary units connected thereto also exceeds a degree compatible with the internal combustion engine, or if the auxiliary power requests on the engine after ramping up the power pick-up of the auxiliary units reaches a predefined operating state, or if the internal combustion engine or the at least one auxiliary unit reaches a predefined operating state under the effect of the fed back motor braking power, a mechanical brake can automatically be connected or electrical energy can be transferred to the braking resistor to reduce a further increase of the electrical motor braking power applied on the internal combustion engine. In one example, due to the engine operating with speed control, the amount of braking power that can be fed back to the engine may be limited. In addition, the amount of braking power that can be fed back to the generator and the system battery may be limited due to conditions such as elevated battery temperature, elevated battery state of charge, etc. During such conditions, by actuating the mechanical brake, the desired braking effort can be provided with reduced wear and tear of the mechanical brakes. For example, the connection or coupling of the braking resistor and/or of the mechanical brake can advantageously be ramped in gently as required. In one example, the braking force applied from the braking resistor and/or the mechanical brake can be successively increased so that a smoother transition from a braking without a mechanical brake to a braking with a mechanical brake, and vice versa, can take place. In one example, the transition can take place in the manner of a blending procedure in a gently transiting manner without a retard burst (that is, without a sudden spike or drop in net braking force, such as while maintaining a target steady rate of braking force application). The braking force of the mechanical brake, but also the braking power which is applied on the at least one auxiliary unit can be gently varied and controlled, in particular regulated, while taking account of the braking power already applied on the internal combustion engine, in order to more accurately provide a desired braking force predefinable by the driver. In one example, the controller may determine a deficit between the net braking power requested and the braking power available via the electric motor braking. Further, the controller may determine a target rate of braking force application. Based on the deficit and the target rate, the amount and rate of braking force applied via the mechanical brake and/or the braking resistor can be adjusted so that the net braking force is provided. As also elaborated herein, the load of the auxiliary units can also be increased (such as by increasing the output of an auxiliary fan or pump) when the retard capacity of the engine is reached.

The electrical braking resistor can in this respect advantageously be used for brief durations for the reduction of braking power peaks, for example only for some seconds, to reduce voltage peaks occurring in the voltage circuit. In permanent operation, the system can advantageously work without the braking resistor.

Braking advantageously only takes place using the mechanical brake when the motor braking power fed back to the internal combustion engine reaches the retard capacity of the internal combustion engine and of auxiliary units which may be connected thereto. In this way, mechanical brake and braking resistor usage is reduced, improving component life.

An increasing electrical motor braking power which is generated by the at least one electric motor can in particular first be applied on the internal combustion engine with an increasing braking power, for example by increasing actuation of a brake generator (e.g., increasing magnitude of actuation of the brake generator, increasing the electrical current directed to the brake generator, etc.) and/or by an increasing slope (that is, increasing rate of actuation or current application at the brake generator), with the fuel supply to the internal combustion engine being successively reduced until the internal combustion engine no longer consumes any fuel at a constant speed. In this way, engine speed feedback control is used for adjusting engine fueling (e.g., a fuel-based engine speed control method is applied) so as to automatically regulate the fuel while the engine concurrently accepts however much current the braking motors are able to provide back to the generator (up to the maximum speed limit of the engine) via the regenerative braking effort. Once this limit is reached, the controller may then further adjusts the output of the auxiliary units (e.g., fans). As the fed back electrical motor braking power increases further, the internal combustion engine can advantageously be revved up beyond a constant engine speed desired (for the current operating conditions) until a maximum permitted or maximum desired engine speed of the internal combustion engine is reached, with the named revving up of the internal combustion engine advantageously taking place with a blocked fuel supply. The maximum permitted or maximum desired engine speed of the internal combustion engine may have a predefined value and may be dependent on vehicle operating conditions such as a battery state of charge, ambient temperature, engine temperature, etc. In one example, the braking power can be received at the engine via the generator and used to increase the engine speed to an upper limit while maintaining engine fueling. Then, once the upper limit of engine speed is reached, further braking power can be received at the engine via the generator and used to maintain the engine speed at or below the upper limit while reducing engine fueling (and/or while increasing the output of the auxiliary units). In this way, the regenerative braking effort can be maximized while performing engine speed control.

If the predefined maximum speed of the internal combustion engine is reached, the control apparatus starts to ramp up the load applied on the engine (or power pick-up) by the at least one auxiliary unit to be able to place further motor braking power on the internal combustion engine via the generator and on the auxiliary unit connected thereto. The ramping up of the electrical load applied by the auxiliary unit in this respect advantageously takes place gently in the sense of a blending procedure to ensure a gentle increase in the braking power. For example, the rate of ramping up of the electrical load applied on the engine via the auxiliary unit may be determined based on regenerating braking effort available, the net braking effort requested, speed limits and constraints of the auxiliary unit (e.g., a speed limit of an auxiliary fan, an output limit of an auxiliary hydraulic pump) as well as battery conditions such as battery temperature and battery state of charge. In this respect, the magnitude of a desired braking force is taken into account, e.g. the increased load applied by the auxiliary unit is only ramped up so much that the provided retard power (provided by the regenerative motor braking) is not larger than the desired retard power.

The control apparatus therefore advantageously provides a plurality of braking stages which can be connected one after one another (e.g., sequentially) to provide the desired or required braking power. Initially or primarily, electric motor braking power is applied on the internal combustion engine without ramping up the power pick-up of the auxiliary unit and without connecting mechanical brakes so as to operate the internal combustion engine energy efficiently with a fuel supply which is reduced as much as possible. Then, upon reaching a retard capacity of the internal combustion engine (beyond which the engine cannot absorb excess energy from regenerative braking) or on reaching the compatibility limit of the application of the electrical motor braking power, the power pick-up of the auxiliary unit is ramped up in a further stage. In this respect, within the aforesaid first braking stage in which the electrical motor braking power is only or at least primarily applied on the internal combustion engine, the fuel supply is in this respect initially reduced in a first sub-stage with a substantially constant internal combustion engine speed for so long until the fuel supply is completely cut off. Once the fuel supply is cut off, a revving of the internal combustion engine is permitted in a second sub-stage. In one example, regenerative motor braking power may be received at the engine via the generator and used to maintain the engine speed while reducing engine fueling. Then, once the engine fueling is below a threshold amount of fuel (e.g., all fueling to the engine is stopped), further braking power can be received at the engine via the generator and used to raise the engine speed to or below an upper limit. In addition, further braking power can be received at the engine via the generator and used to raise the output of one or more auxiliary units, such as to increase a fan speed or a pump output.

The named control apparatus is configured in a further development of the present disclosure such that the optionally present mechanical brakes remain unactuated or released for so long until the desired or required braking power can be applied on the internal combustion engine and on the auxiliary units connected thereto via electrical motor braking and feeding back of the motor braking power, in particular for so long until the fed back motor braking power does not exceed a predefined limit value and/or the internal combustion engine acted on by the fed back motor braking power and/or the auxiliary unit connected thereto does/do not leave a predefined operating state or operating state range, in particular does/do not exceed a predefined engine speed.

The control apparatus can in particular connect the mechanical brake in dependence on the engine speed of the internal combustion engine, specifically, only when the speed of the internal combustion engine reaches a predefined maximum speed and the at least one auxiliary unit is operated to a pre-defined maximum power pick-up. The control apparatus can for this purpose be connected to a speed detection device (e.g., a speed sensor) which provides the speed of the internal combustion engine and to a determination device for determining the operating state and/or the power pick-up of the at least one auxiliary unit. For example, a current, voltage sensor, or pressure sensor may be coupled to the auxiliary unit and/or a torque sensor may be coupled to a shaft of the auxiliary unit for determining an electrical load of the auxiliary unit on the engine.

The control apparatus can furthermore comprise an engine controller (such as a controller with computer-readable instructions stored on non-transitory memory which when executed can perform the following steps or functions) for reducing the fuel supply to the internal combustion engine in a manner which initially reduces the fuel supply while maintaining a constant speed of the internal combustion engine. That is, fueling is adjusted for engine speed control. In particular, the engine controller may send a signal to engine cylinder fuel injectors to reduce fueling to an increasing degree such that with an increasing application of electrical motor braking power on the internal combustion engine the fuel supply is progressively driven to zero and in so doing the engine speed is kept constant and/or at least at a predefined minimal speed, for example an engine idling speed.

The control apparatus can generally be realized in different manners, for example in the form of software which is executed by a central control computer or in the form of a plurality of software modules which are executed in separate calculation modules or in the form of one or more separate or interlinked control modules.

The present disclosure will be explained in more detail in the following with reference to associated drawings.

DETAILED DESCRIPTION

Figure 1:
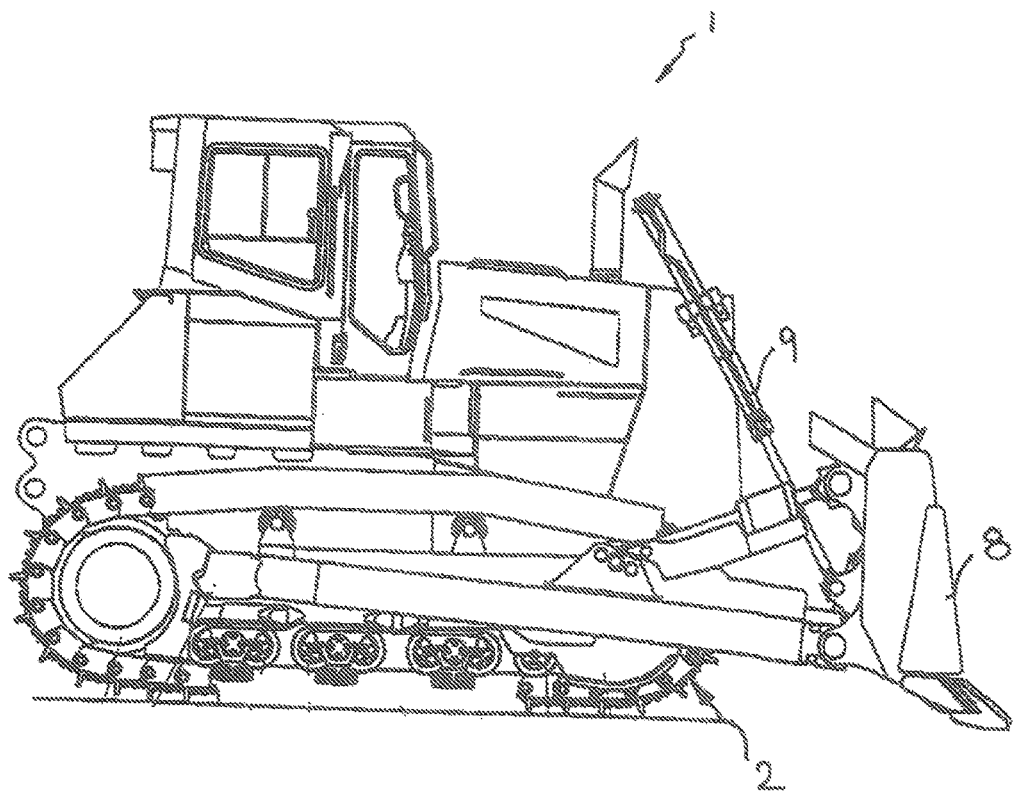
FIG. 1 shows a schematic side view of a self-propelling work machine which can be configured as a bulldozer in accordance with an advantageous embodiment of the present disclosure and which comprises an electric drive as a traction drive which is supplied with current from a generator which can be driven by an internal combustion engine, for example in the form of a diesel engine.

FIG. 1 shows a self-propelling work machine 1 which in the depicted example is configured as a bulldozer. Machine 1 comprises a tracked chassis as the undercarriage 2. It is understood that the work machine can also be configured in different forms, for example as a construction machine or as a mining machine having a wheel undercarriage, for example in the form of a dump truck or truck.

The drive system of the work machine 1 comprises at least one electric drive 3 having at least one electric motor 4 which can serve as a traction drive and can drive the chain drive of the bulldozer of FIG. 1 or a wheel of the undercarriage. As FIG. 2 shows, a plurality of electric motors 4 can also be provided, for example as an individual wheel drive or for driving a plurality of axles.

Figure 2:
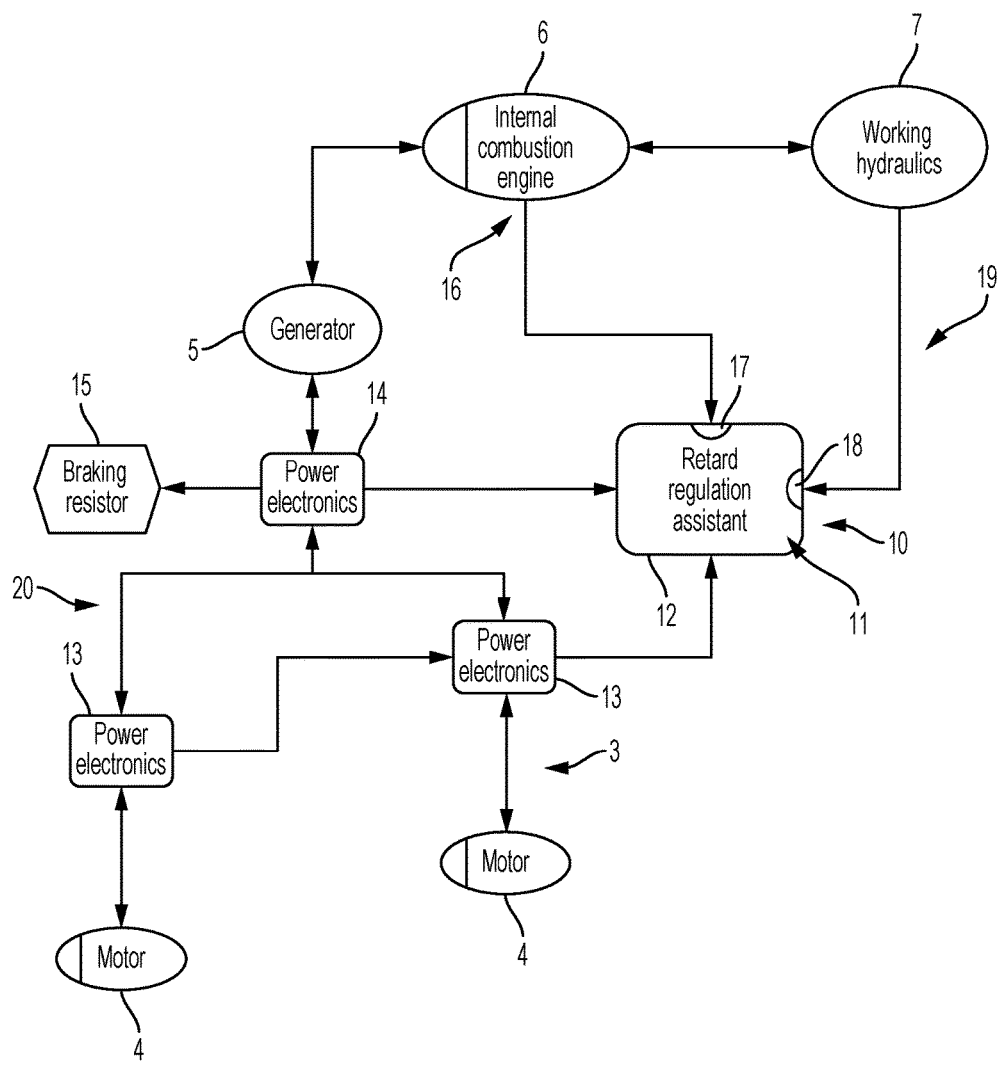
FIG. 2 shows a schematic representation of the components of the drive system of the work machine of FIG. 1 and of a control apparatus comprising a retard regulation assistant which distributes the electrical motor braking power generated on the braking of the work machine to different modules of the drivetrain and controls them.

As FIG. 2 shows, the electric drive 3 is supplied with electric current from a generator 5, the generator 5 being driven by an internal combustion engine 6 which can be formed, for example, as a diesel engine.

The work machine 1 can furthermore comprise at least one hydraulic unit 7 which can, for example, in the embodiment of the work machine 1 in the form of a bulldozer serve for adjusting the dozer blade 8 and can for this purpose comprise at least one hydraulic actuator 9, for example in the form of a hydraulic cylinder of the bulldozer.

The hydraulic unit 7 can comprise a pressure source actuatable by the internal combustion engine 6 or in the form of a hydraulic pump to supply the operating hydraulics with hydraulic fluid and hydraulic pressure.

Alternatively or additionally to the named hydraulic unit 7, the work machine 1 can also comprise one or more additional auxiliary units such as a cooling apparatus or a cooling fan (not shown in the drawings) and which can likewise be coupled to the internal combustion engine 6 such that they can receive power from the engine.

A braking apparatus 10 for braking the work machine 1 can comprise mechanical brakes for braking the chain drive or the wheel drive and can be configured, for example, in the form of spring pre-loaded brakes which can be hydraulically ventilated.

The braking apparatus 10 furthermore comprises the use of the at least one electric motor 4 as the generator in order to provide the desired braking power by the electric drive 3 by way of regenerative braking. The electrical motor braking power provided by the electric motors 4 is controlled and distributed by a control apparatus 11, which comprises a feedback regulator or retard regulation assistant 12.

As FIG. 2 shows, power electronics 13 can be associated with the electric drive 3 or with each electric motor 4. By means of the power electronics 13, during a motor operation (wherein power is output from the motor and is used to assist the engine output), power supplied to the electric motor 4 is varied and, conversely, during a retard operation (wherein excess power generated by the engine or via regenerative braking is absorbed by the motor), the returned motor braking power can be controlled. Further power electronics 14 can also be provided in a higher-ranking manner between the electric drive 3 and the generator 5 and can be connected to a braking resistor 15 so as to be able also to reduce fed back motor braking power dissipatively at this braking resistor 15, as required.

Retard regulation assistant 12 is connected to the named power electronics 14 to regulate the fed back motor braking power. Herein, the fed back motoring power is the power absorbed during a retard operation that is then fed back to the engine via the generator of the drive system. The retard regulation assistant 12 is furthermore connected to the internal combustion engine 6 and to the hydraulic unit 7 in order to monitor their operating states by means of a suitable sensor system and conversely optionally also to influence their working parameters or operating parameters via control modules. A monitoring sensor system 16 may, for example, comprise a speed sensor for monitoring the speed of the internal combustion engine 6 and a pressure sensor for monitoring the hydraulic pressure in the hydraulic unit 7.

Retard regulation assistant 12 can have engine control means 17 for controlling the internal combustion engine 6, in particular for reducing the fuel supply, and/or can have hydraulic control means 18 for controlling the hydraulic unit 7, in particular for varying the power pick-up, for example via changing the flow rate and/or the conveying pressure of the pump of the hydraulic unit 7, as previously explained. For example, engine control means 17 may include one or more engine torque actuators, such as an intake throttle, valve timing, spark timing, cam timing, fuel injector, etc., and the retard regulation assistant 12 may send a command signal to the actuator to control the engine. In one example, the retard regulation assistant 12 may send a command signal (e.g., pulse width or duty cycle signal) to a cylinder fuel injector to reduce the fuel supply to the engine.

Figure 3:
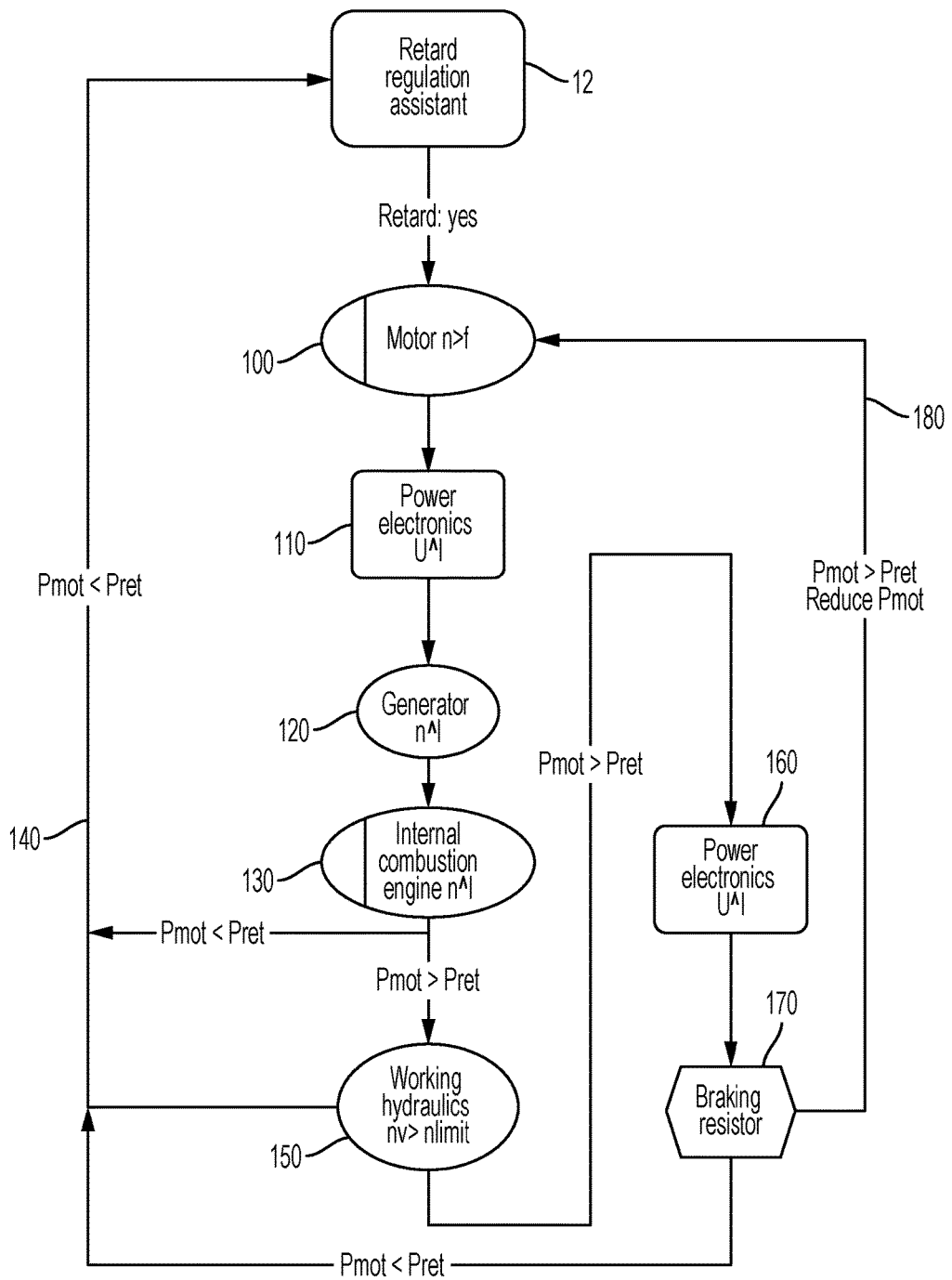
FIG. 3 shows a flowchart for presenting the method steps executed on the braking of the work machine of FIGS. 1-2.

If a machine operator desires a specific braking force, for example by actuating a brake pedal or a brake lever or by actuating a braking request button, the retard regulation assistant 12 can control or regulate the regenerative motor braking, as is illustrated in the method of FIG. 3.

If a braking request is present the retard regulation assistant first checks whether the internal combustion engine 6 is already running at its upper speed limit, at step 100 in FIG. 3. If this is not the case, e.g. if the internal combustion engine can still provide or pick-up retard power, the retard regulation assistant controls the power electronics to generate regenerative motor braking power at the electric motors and feed the generated braking power back to the generator, at steps 110 and 120 of FIG. 3. This feeding back of the motor braking power to the generator results in an increase of the speed of the internal combustion engine. This can initially advantageously be compensated or reduced or limited in that the fuel supply is reduced, which results in a particularly efficient operation of the work machine. The fuel supply can in this respect advantageously be reduced by the retard regulation assistant such that initially no speed change of the internal combustion engine occurs even as the braking power is applied, with the reduction of the fuel supply being able to be increased step-wise or continuously until no more fuel at all is supplied.

If such a compensation by reducing the fuel supply is no longer possible, the speed of the internal combustion engine increases, which the retard regulation assistant generally permits, at step 130 in FIG. 3.

If the motor braking power to be supplied due to the desired braking force is still smaller than the retard power which can be picked up at the internal combustion engine, the feedback regulation works in a loop, as shown at branch 140 in the flowchart of FIG. 3. That is, branch 140 is taken when Pmot<Pret, e.g. the motor braking power is smaller than the retard power applied by the internal combustion engine.

If, based on the monitored speed of the internal combustion engine, it is determined in step 130 that the internal combustion engine is working at its upper speed limit, e.g. the engine can no longer take up any further retard power, the retard regulation assistant checks in step 150 whether further motor braking power can be applied in the hydraulic unit. For example, it may be determined if the conveying volume or the conveying pressure can be changed, if the pump can be swiveled out further and/or if a restriction resistance can be increased. If the motor braking power corresponding to the desired braking force can be taken up via such adjustments, e.g. if the motor braking power does not exceed the retard power which can be provided by the internal combustion engine and by the work hydraulics, the regulation in turn takes the branch 140.

If, on the other hand, the retard power of the hydraulic unit and of optionally present further auxiliary units such as fans is reached, the retard regulation assistant controls the power electronics which are connected to the braking resistor to dissipatively reduce further motor braking power at the braking resistor at steps 160 and 170 in FIG. 3. If the braking resistor cannot take up the motor braking power which cannot be applied any more at the internal combustion engine and at the hydraulic unit, the regulation again returns via the step 140 since Pmot<Pret, at step 140 in FIG. 3.

If the motor braking power or the portion exceeding the retard capacity of the internal combustion engine and of the hydraulic unit, however, exceeds the retard capacity of said braking resistor, the retard regulation assistant reduces the motor braking power by a corresponding control of the power electronics 14, at step 180 in FIG. 3.

In this case, the desired braking force of the machine operator can no longer be satisfied by regenerative braking by means of the electric drive so that the work machine would be braked more slowly or less powerfully than is desired by the machine operator. In other words, the desired braking force would not be provided. To address this issue, when the maximum retard power of the retard system has been reached, a mechanical brake can be connected, which can advantageously take place gently with an increasingly rising braking force so that the net braking force is as close as possible to the desired braking force.

Figure 4:
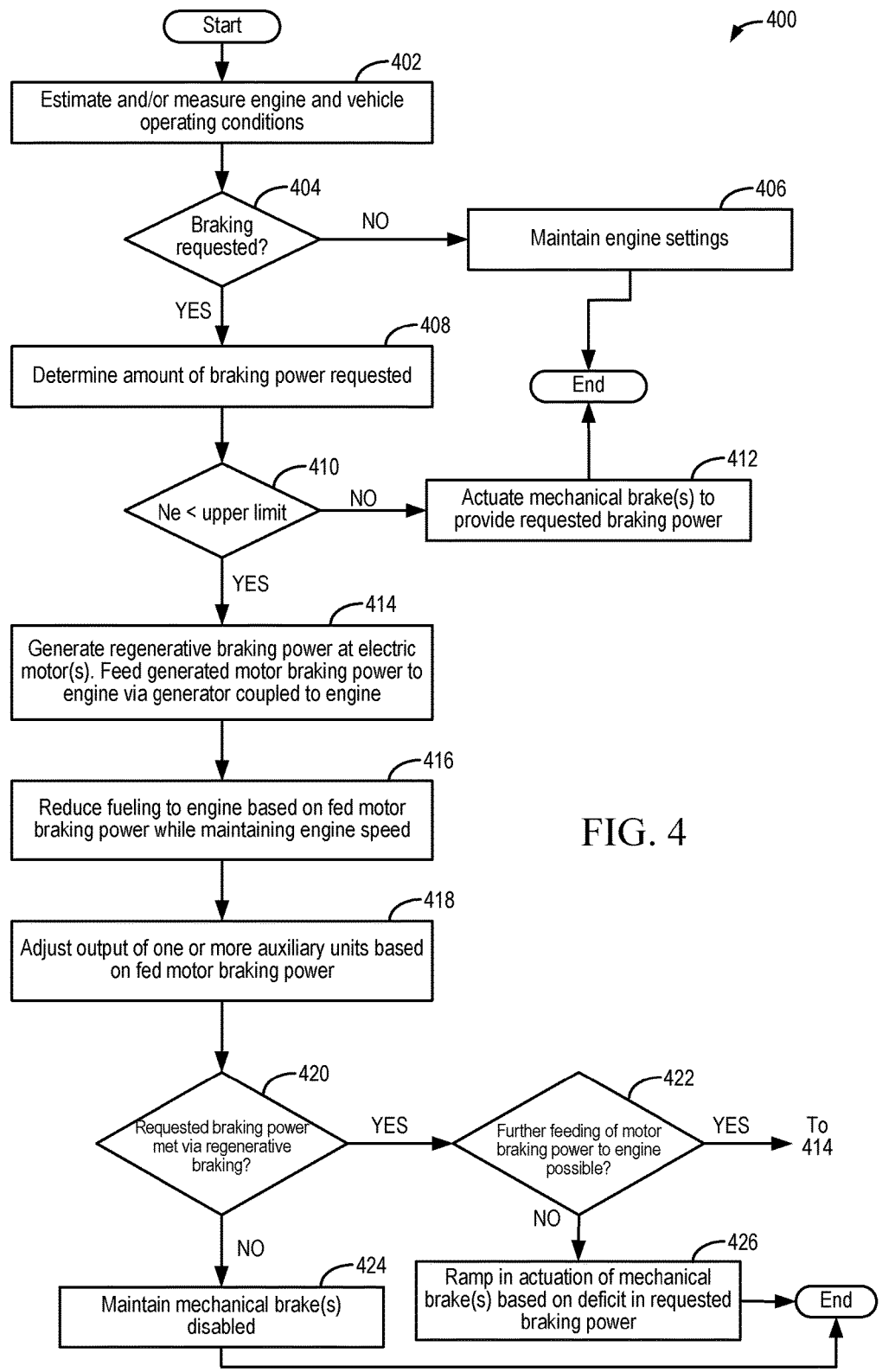
FIG. 4 shows a flowchart of an example method for using engine speed feed-back control for adjusting engine fueling and for regulating the amount of motor braking effort that can be fed back to a generator coupled to the engine.

Turning now to FIG. 4, an example method 400 is shown for adjusting engine fueling and for regulating the amount of motor braking effort that can be fed back to a generator coupled to the engine.

At 402, the method includes estimating and/or measuring vehicle and engine operating conditions. For example, parameters assessed may include engine speed, engine load, vehicle speed, operator torque demand, battery state of charge, ambient conditions such as ambient temperature, barometric pressure, and ambient humidity, manifold pressure and flow, engine dilution, etc. At 404, the method includes determining if braking has been requested. For example, it may be determined if the operator has actuated a brake device, such as a brake pedal, a brake lever, or a braking request button. If no braking request has been received, at 406, the method includes maintaining engine settings and then the routine ends.

If braking is requested, at 408, the method includes determining an amount of braking power (or braking force) requested. For example, based on a degree of actuation (or displacement) of the brake pedal, or a position of the brake lever, an amount of braking power requested may be determined. In addition, a requested rate of braking force application may also be determined.

At 410, it may be determined if the engine speed is at below upper limit. For example, it may be determined if the engine speed is below a limit above which regenerative braking effort cannot be received at the engine. If not, that is if the engine is at the upper speed limit, then at 412, the method includes actuating mechanical brakes and/or braking resistors of the vehicle system to provide the requested braking effort. For example, a degree of actuation of the mechanical brakes may be adjusted to provide the requested braking effort. Herein, a regenerative motor braking effort is not fed back to the engine because the engine does not have retard capacity.

If the engine speed is below the upper limit, then at 414, the controller may infer that the engine is capable of receiving regenerative braking effort. That is, the engine does have retard capacity. The controller may infer the magnitude of the engine's retard capacity based on the engine speed relative to the upper limit. Then, the controller may generate or enable regenerative braking power at the electric motor(s) of the electric drive system. For example, the controller may enable the electric motor(s) to be driven using wheel torque during regenerative braking. Further, the controller may feed the generated motor braking power to the engine via the generator. In particular, as the electric motor(s) is driven by regenerative braking, the electric motor may be used to supply an electric current to the generator which is coupled to the engine. As such, in the absence of motor braking effort, an electric current is provided at the generator using engine torque generated by combustion of fuel at the engine. The electric current provided at the generator is used to support auxiliary loads of the engine such as auxiliary fans and pumps. By using the electric current provided at the generator via the motor braking effort, the load on the engine is reduced, enabling the engine to run more efficiently (e.g, at a higher speed or with lower fuel consumption). The controller may also measure or infer the amount of power being fed back into the engine via one or more sensors. For example, the motor braking effort fed back into the engine may be inferred based on the output of a speed sensor, based on the output of a torque sensor coupled to a shaft of the engine and/or generator, etc.

At 416, the method includes reducing fuel delivered to the engine based on the fed motor braking power while maintaining the engine speed. Herein the engine is operated with speed control (at a constant speed) and fueling is adjusted to maintain the engine speed. By using the electric current provided at the generator via the motor braking effort, the load on the engine is reduced, enabling the engine to run at the same speed with lower fuel consumption. Thus as the motor braking effort that is fed back to the engine is increased, the fuel delivered to the engine to maintain the engine speed may be correspondingly reduced. In one example, the engine fueling is gradually ramped down as the motor braking power fed into the engine is ramped up.

At 418, the method further includes adjusting the output of one or more auxiliary units of the electric drive system based on the motor braking power fed into the engine. In one example, the output of the one or more auxiliary units of the electric drive system may be increased so that the motor braking power fed into the engine can match the requested braking power (requested at 404). Increasing the output includes, for example, increasing a speed of an auxiliary cooling fan, increasing a pump speed, flow, or pressure of an auxiliary hydraulic pump, actuating an auxiliary device, etc. In some examples, the output of the auxiliary unit(s) may be increased selectively only after the engine fueling has dropped to below a threshold amount of fuel, such as to an amount of fuel required for idling, or when engine fueling has been cut off. In still other examples, the output of the auxiliary unit(s) may be increased only after the retard capacity of the engine is reached and the engine is not capable of accepting any further motor braking power on its own without the adjustment to the auxiliary unit. In other examples, such as where the engine speed is increased while maintaining engine fueling as the motor braking power fed back to the engine increases, the output of the auxiliary units may be increased only after the engine speed has increased to an upper limit above which the engine is not capable of accepting further motor braking power. In one example, the output of the auxiliary units may be increased above settings required for nominal (or current) conditions.

At 420, it may be determined if the requested braking power has been met via the regenerative motor braking power fed back to the engine. If yes, then at 424, the controller may maintain mechanical brakes (and braking resistors) disabled. In this way by meeting the braking needs using motor braking power fed back to the engine, wear and tear of mechanical brakes is reduced, and component life is extended.

If the requested braking power has not been met via only the regenerative motor braking power fed back to the engine, at 422, the method determines if further motor braking power can be fed to the engine. If one example, the engine can continue to receive power while the engine speed is below an upper speed limit. In another example, the engine can continue to receive power while engine fueling is above a threshold amount. If further feeding of motor braking power to the engine (via the generator) is possible, then the method returns to 414 to feed regenerative motor braking power to the engine while adjusting engine fueling, engine speed, and/or auxiliary unit load applied on the engine via the generator.

If further feeding of motor braking power to the engine (via the generator) is not possible, then at 426, the controller may provide a deficit to the requested braking effort via the mechanical brake and/or braking resistor. For example, the controller may calculate a deficit between the requested braking power and the braking power available via the regenerative motor braking fed into the engine. Then, the controller may adjust a degree and/or duration of actuation of the mechanical brake and/or braking resistor to meet the deficit. This includes adjusting a rate of ramping in actuation of the mechanical brake and/or braking resistor to provide the requested braking power.

In this way, engine performance in an electric drive system can be improved. By feeding power generated during regenerative motor braking via an electric motor into a generator coupled to an engine, the load applied on the engine can be reduced. This enables fuel-based engine speed control to reduce the amount of fuel delivered to an engine while maintaining engine speed. By increasing the output of one or more auxiliary units responsive to the engine reaching a retard capacity, regenerative braking can be used to meet the desired braking with reduced need for applying mechanical brakes or braking resistors. As a result, component lift is also extended.

The invention claimed is:

1. A self-propelling work machine, comprising:
   an internal combustion engine;
   an electric drive having at least one electric motor, a generator drivable by the internal combustion engine and supplying the electric drive with electrical energy, and at least one auxiliary unit coupled to the internal combustion engine;
   a braking apparatus configured to provide a regenerative braking by the electric drive;
   a feedback apparatus for feeding back electrical motor braking power from the electric motor to the internal combustion engine via the generator; and
   a controller with computer readable instructions stored on non-transitory memory for adjusting an electrical load of the at least one auxiliary unit of the internal combustion engine based on the electrical motor braking power fed back to the internal combustion engine via the generator.

2. The machine of claim 1, wherein the controller includes further instructions for further adjusting the electrical load of the at least one auxiliary unit of the internal combustion engine based on an engine speed while the internal combustion engine receives the fed back electrical motor braking power.

3. The machine of claim 1, wherein feeding back electrical motor braking power from the electric motor to the internal combustion engine via the generator includes transferring an electrical current corresponding to the electrical motor braking power from the electrical motor to the generator.

4. The machine of claim 3, wherein the electrical motor braking power is fed back to the internal combustion engine via the generator until a retard capacity of the internal combustion engine is reached.

5. The machine of claim 4, wherein the controller includes further instructions for:
   reducing a fuel supplied to the internal combustion engine while maintaining a substantially constant engine speed while the electrical motor braking power is fed back to the internal combustion engine via the generator, and;
   after the fuel supplied has been reduced to below a threshold amount of fuel, increasing the engine speed via the electrical motor braking power fed back into the internal combustion engine until an upper threshold engine speed is reached.

6. The machine of claim 4, wherein the controller includes further instructions for: after the retard capacity of the internal combustion engine is reached, feeding back the electrical motor braking power to the at least one auxiliary unit while increasing the electrical load of the at least one auxiliary unit on the internal combustion engine.

7. The machine of claim 1, further comprising an engine speed sensor, wherein the controller adjusts the electrical load of the at least one auxiliary unit on the internal combustion engine to maintain a substantially constant engine speed, the adjusting including:
   estimating an engine speed based on an output of the engine speed sensor, and increasing the electrical load of the at least one auxiliary unit on the engine as the engine speed exceeds a predefined engine speed, and decreasing the electrical load of the at least one auxiliary unit on the internal combustion engine as the engine speed falls below the predefined speed of the engine.

8. The machine of claim 7, wherein the at least one auxiliary unit includes a hydraulic pump which is not required for propulsion of the machine, the hydraulic pump conveying fluid in idle circulation when actuated or the hydraulic pump being swiveled to convey a quantity of zero.

9. The machine of claim 8, wherein the electrical load of the hydraulic pump conveying fluid in idle circulation when actuated is increased by a control apparatus via actuation of a pressure relief valve such that a flow resistance in the idle circulation is gradually increased, and wherein the electrical load of the hydraulic pump swiveled to convey the quantity of zero when actuated can be increased by the controller to successively swivel out the hydraulic pump against a constant flow resistance in circulation, against the pressure relief valve set to a fixed setting.

10. The machine of claim 1, wherein the feedback apparatus comprises at least one motor inverter coupled to the at least one electric motor, at least one generator inverter coupled to the generator, and at least one DC voltage intermediate circuit coupling the at least one motor inverter to the at least one generator inverter.

11. The machine of claim 4, further comprising a mechanical brake and an electrical braking resistor, wherein the controller includes further instructions for: after the retard capacity of the internal combustion engine has been reached and the electrical load of the at least one auxiliary unit has been increased up to a threshold load, providing further braking corresponding to a deficit in desired braking via one or more of the mechanical brake and the electrical braking resistor, the mechanical brake actuated after a braking capacity of the electrical braking resistor is exhausted.

12. A method for braking a work machine, comprising:
operating an electric motor during regenerative braking to generate electrical motor braking power;
feeding the generated electrical motor braking power to a generator coupled to an engine via a feedback apparatus;
applying a mechanical drive power generated at the generator via the electrical motor braking power on the engine via the generator; and
varying an electrical load of an auxiliary unit coupled to the generator based on one of the electrical motor braking power fed back to the engine via the generator, and an operating state of the engine while the electrical motor braking power is fed to the engine via the generator.

13. The method of claim 12, further comprising:
reducing a fuel supply to the engine while maintaining an engine speed as the electrical motor braking power fed back to the engine increases until the fuel supply is cut off;
then, with the fuel supply to the engine cut off, increasing the engine speed via the fed back electrical motor braking power until a predefined threshold engine speed is reached; and
when the engine speed is at the predefined threshold engine speed and the electrical motor braking power is less than a desired braking force requested by an operator, increasing the electrical load of the auxiliary unit.

* * * * *